G. H. LEITNER & W. E. JOHNSON.
PICK MATCHING MECHANISM FOR AUTOMATIC WEFT REPLENISHING LOOMS.
APPLICATION FILED JUNE 26, 1907.
927,662.
Patented July 13, 1909.
4 SHEETS—SHEET 1.
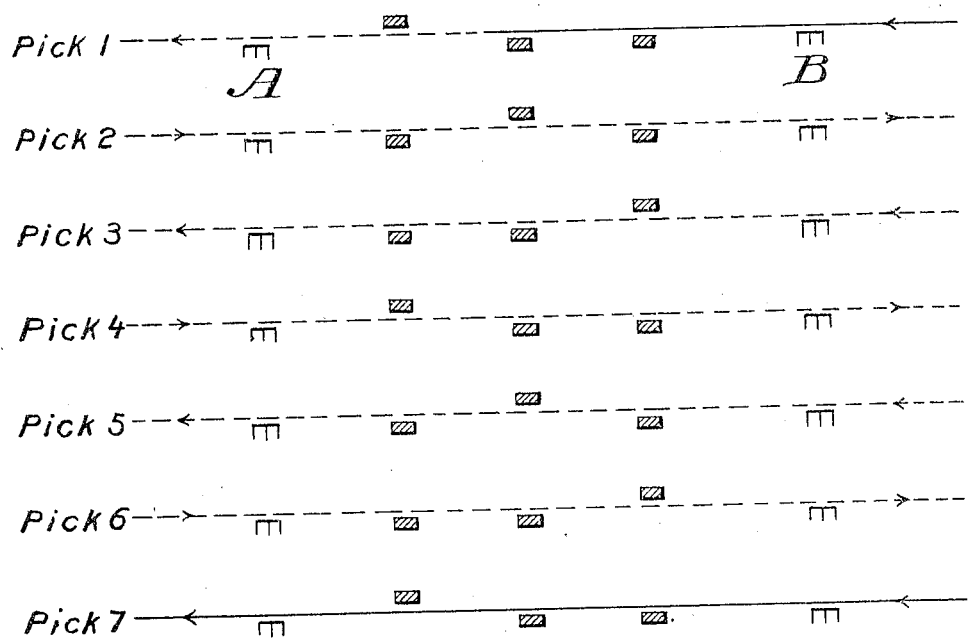
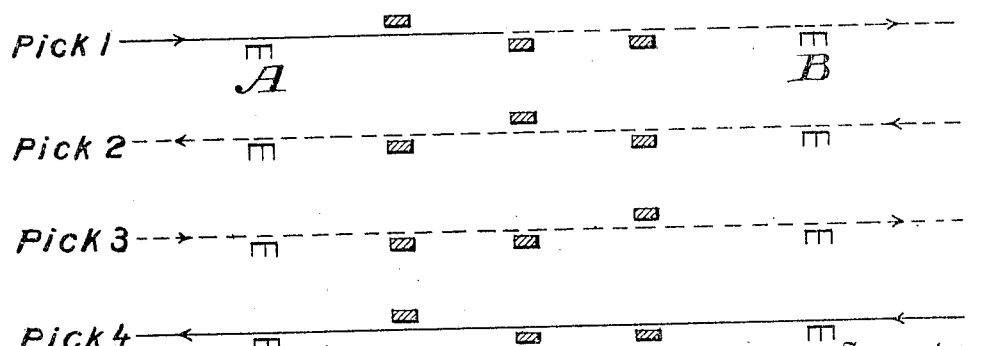

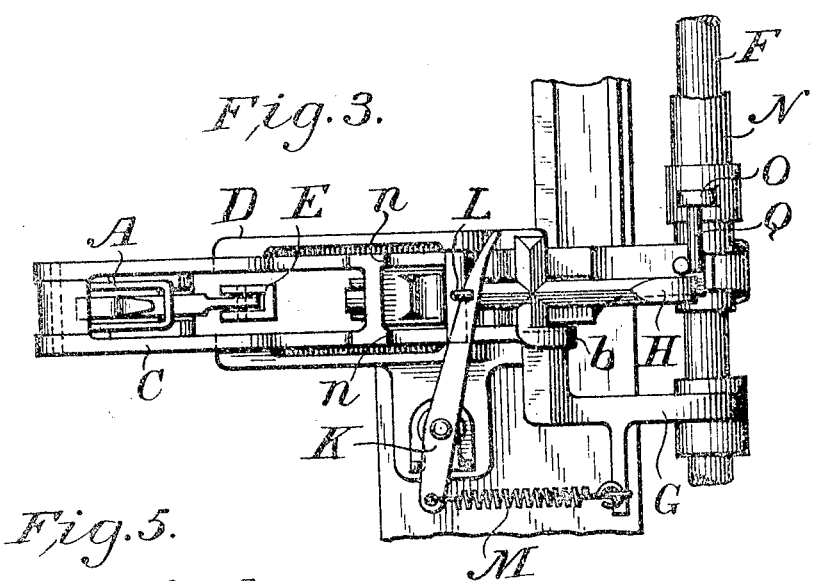
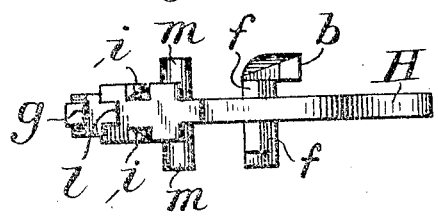
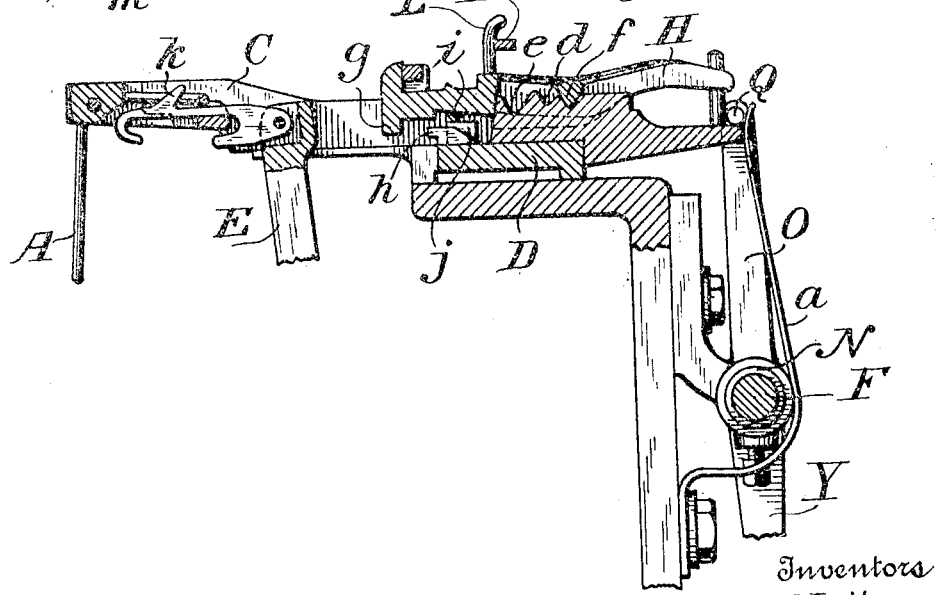

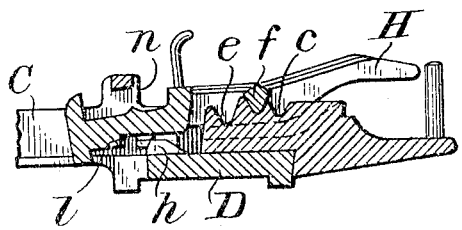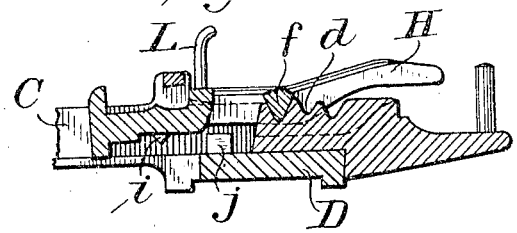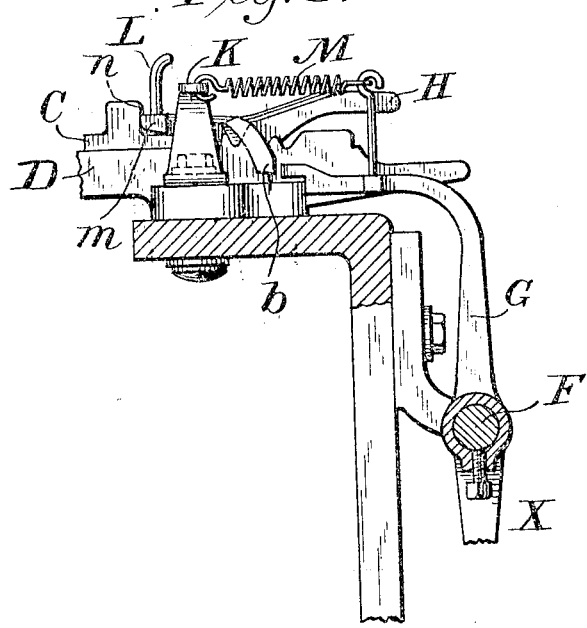

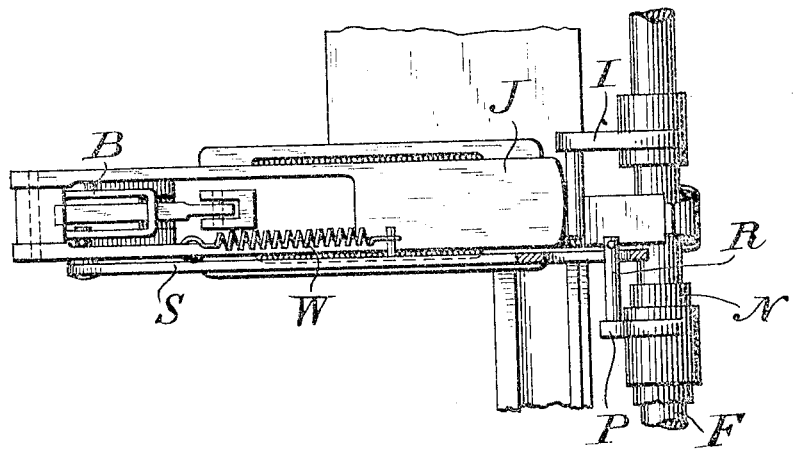
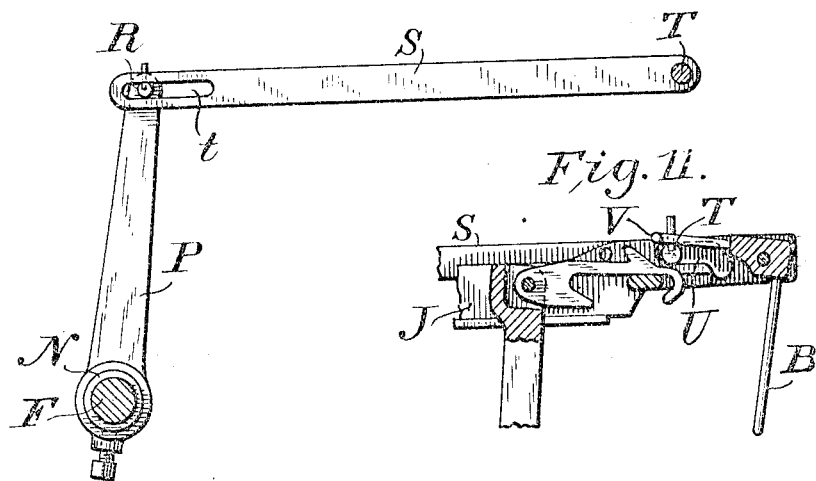
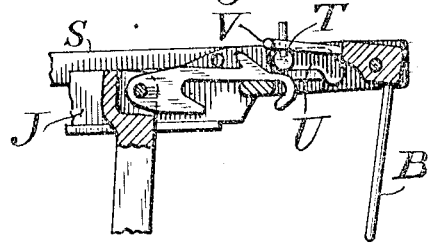
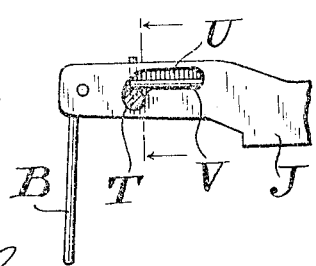

UNITED STATES PATENT OFFICE.

GEORGE H. LEITNER AND WILLIAM E. JOHNSON, OF AUGUSTA, GEORGIA, ASSIGNORS TO DRAPER COMPANY, OF HOPEDALE, MASSACHUSETTS, A CORPORATION OF MAINE.

PICK-MATCHING MECHANISM FOR AUTOMATIC WEFT-REPLENISHING LOOMS.

No. 927,662.　　　　Specification of Letters Patent.　　　Patented July 13, 1909.

Application filed June 26, 1907. Serial No. 380,897.

*To all whom it may concern:*

Be it known that we, GEORGE H. LEITNER and WILLIAM E. JOHNSON, citizens of the United States, residing at Augusta, in the county of Richmond and State of Georgia, have invented certain new and useful Improvements in Pick-Matching Mechanism for Automatic Weft-Replenishing Looms, of which the following is a specification.

The purpose of the present invention is to match the pick in double-fork automatic weft-replenishing looms in order that there may be no blemish in the cloth in the case of looms employing a multiplicity of harnesses.

The present improvements will be described as applied to the well known Draper or Northrop loom shown in United States Patent No. 529,940, November 27, 1904 in which a fresh bobbin is supplied to the running shuttle in case of weft-absence, and when said loom is equipped with three harnesses. The improvements involve no alteration in the automatic weft-supply mechanism, nor in the shedding mechanism which continues to act in its normal manner throughout the entire period of weft-absence detection, pick-matching, and weft-replenishing. Hence it is only necessary, for an understanding of the improvements, to illustrate and describe those added and altered features of the above mentioned Draper loop which directly contribute to the performance of matching the pick. These features are shown in the accompanying drawings, wherein—

Figure 1, is a diagram illustrating the action in case the detector at the side of the loom remote from the weft-supply first detects weft-absence, this side in the illustrated loom, being the left-side. Fig. 2, is a similar diagram illustrating the action when the detector at the weft-supply side first detects weft-absence, this being the right-side, as here shown. Fig. 3, is a plan view of the detector and associated mechanism at the left side. Fig. 4, is a vertical section of the devices shown in Fig. 3. Fig. 5, is an underside view of the "coupler" at the left side. Figs. 6, and 7, are vertical sections of parts of the mechanism shown in Fig. 3, showing different positions of the coupler. Fig. 8, is a vertical section looking toward the devices shown in Fig. 3. Fig. 9, is a plan view of the detector and associated devices at the right side of the loom. Fig. 10, is a vertical section through the starting or change-shaft looking toward the connecting mechanism whereby the right detector is rendered idle when the left detector first detects weft absence. Fig. 11, is a side view of the inner end of the detector slide at the right side. Fig. 12, is a vertical section through the inner end of the right detector slide. Fig. 13, is a cross section of the right detector slide.

In the particular three harness loom to which the improvements have been applied the weft-supplying mechanism is at the right. Two weft-absence detectors consisting of side weft-forks of usual construction are employed, and to distinguish them they will be designated as the main fork A, and the companion fork B, respectively.

The matching of the pick will be readily understood by reference to the diagrams Figs. 1 and 2, in which the shed-formation and the picking are conventionally shown.

Referring to Fig. 1, let it be assumed that the weft fails when the shuttle is traveling to the left, as indicated by the line partly full and partly dotted at pick No. 1. The main fork A, which is at the left side of the loom, then detects weft-absence. This is followed by five idle or blank picks with the empty shuttle, as indicated by the dotted lines at picks Nos. 2, 3, 4, 5, and 6. During these idle picks, the harnesses continue to change and progress in normal order. At the end of pick No. 6, the empty shuttle is at the supply (right) side of the loom and then receives a fresh supply of weft. Pick No. 7, is to the left and lays the strand of fresh weft in the same shed formation as that in which the failure occurred. Hence there can never be a shed which does not contain a full pick, although a shed may contain a partial pick also, in the event that the main fork detects weft-absence.

Fig. 2, shows the action in case the companion fork B, (at the right side of the loom) first detects weft-absence, as when the weft fails with the shuttle traveling from left to right as indicated at pick No. 1. This is followed by two blank picks Nos. 2, and 3, at the end of which the empty shuttle is at the supply side where it receives fresh weft. The fourth pick lays a strand of fresh weft;

and, since the harnesses have been shifting in normal sequence, the fresh strand is laid in the same shed-formation as that in which the deficiency occurred. In this case also, there can never be less than a full pick in any shed.

The foregoing actions involve a differential delay in the replenishment of weft depending upon which fork first detects; and the difference in the number of blank picks is just equal to the number of harnesses. It is evident that, during the blank picks, the two forks alternately detect weft-absence. Provision is made to compensate for these extra detections. Also, the action of the take-up is stopped so as to prevent a thin place in the cloth.

The main fork A, and its associated devices will first be described, in connection with Figs. 3 to 8 inclusive. The fork itself is of usual construction and is mounted as usual in a fork-slide C, which slides back and forth in a guide stand D, fast on the breast-beam. The fork coöperates with a weft-hammer E, of known construction and timing; and the slide C, is pressed rearwardly or inwardly by a customary spring a. The weft-fork and slide coöperate with the customary starting or change shaft F, of the Draper loom to put the weft-supply into action; and, as all the connections between this starting or change shaft and the weft-supplying mechanism remain unaltered, nothing except this shaft is shown, since it sufficiently identifies the weft-supplying mechanism. In the present case, however, the arm G, fast on the change shaft does not directly coöperate with the slide C, as in the Draper loom; but indirectly through a normally idle coupler H, which is mounted on the slide C, and has an independent forward and back movement thereon. This coupler is mounted on the slide, and is constructed like the so-called "latch-carrier" shown in United States Letters Patent No. 789,291 to Jonas Northrop, dated May 9, 1905, but with the characteristic difference that in said patent it coöperates with a knock-off lever to stop the loom after a succession of detections of weft-absences, whereas in the present case, it coöperates with the arm G, of the change shaft to rock said shaft to effect the supply of fresh weft. It will suffice, therefore, to mention the structure and operation of the coupler so far as they are important in connection with the new result achieved.

The coupler has three positions relatively to the slide C, in the outer two of which, (Figs. 5, and 6) it is idle relatively to the arm G. When, however, it occupies its third or innermost position, (Figs. 7, and 8) it then encounters the arm G to effect weft-supply when the slide C, next moves forward under the action of the weft-hammer.

At one side the coupler has a depending dagger b, which in its two forward or outward positions is above the adjacent end of the arm G; but when the coupler is in its innermost position this dagger drops down behind the arm G, so as to encounter it as the slide C, moves forward.

The slide C, has a series of notches, c, d, e, with which lugs f, f, on the coupler engage thus determining the three different positions of the coupler. Normally, the lugs f, f, occupy the outer notches c, and then a depending shoulder g, of the coupler is back and in the plane of a stop h, on the fixed guide stand D; while depending feet i, i, of the coupler rest on lateral lugs j, j, of the slide C. In Fig. 7, the stop h, is omitted to show more clearly one of the lugs j. If now the fork A, detects weft-absence it is caught by the hook k, of the weft-hammer, and the slide C, is moved forward a definite distance. The coupler H, does not move all the way with it, being stopped, its shoulder g, encountering the stop h. Hence, as the slide C, completes its forward movement, its notches c, pass forward of the coupler lugs f, and the intermediate notches d, register with said lugs. At the same time the lugs j, of the slide C, pass forward of the feet i, of the coupler which then assumes an inclined position. When the slide C, is again pushed back by a spring a, it carries the coupler with it, which then occupies its middle and inclined position, as shown in Fig. 6. On the next following detection of weft-absence by the fork A, (following pick 3 in Fig. 1), the slide C, again moves forward with it, but the coupler does not move all the way forward because the dropping of its feet i, from the lugs j, and the consequent inclined position of the coupler has brought a second shoulder l, of the coupler in the plane of the fixed stop h. Hence, the coupler lugs f, now drop into the deep rear notches e, of the slide. Then when the slide is again moved back by the spring a, the coupler is carried with it, and its front end drops to its lowest position with its dagger b, back of, and in the plane of, the upper free end of the change shaft arm G, as shown in Figs. 7 and 8. When the third detection of weft-absence occurs (following pick No. 5, in Fig. 1), and the slide C, is again carried forward by the weft-hammer, the coupler is carried forward too, owing to lateral arms m, m, of the coupler being then just forward of standards n, n, of the slide C. During this forward movement, the coupler dagger b, encounters the change shaft arm G, and the supply of fresh weft is instituted, the timing of the parts being such that the fresh weft is supplied when the shuttle is at the supply side following pick 6, in Fig. 1. The coupler then goes back with the slide C; but, at the next succeeding forward stroke of the weft-hammer (which is ineffective on the slide since the fresh thread tilts the fork A), it encounters the rear end of the coupler and moves it forward to its normal idle position with the lugs $f$, in the front notches $c$. Hence, the successive detections of the fork A, are ineffective to govern weft-supply until the successive rearward steps of the coupler bring it into active relation with the change shaft arm. In the case of three harnesses, two successive rearward movements of the coupler involve a sufficient delay to insure the fresh pick being laid in the correct shed.

In case the right or companion fork B, first detects weft absence, the action is for its weft-hammer to catch the fork, move the weft fork slide forward, and rock the change shaft as in the normal action of the Draper loom; since the right-hand arm I, fast on the change shaft F, is directly encountered by the right hand fork-slide J, as shown in Fig. 9. The weft-hammer cam at the right, however, does not have sufficient throw to rock the change-shaft far enough to effect weft-supply, so that no weft is supplied when the shuttle is in the wrong (or left-hand) box. It is obvious, also, that before the lay is forward, following pick No. 3, in Fig. 2, the right slide J will have moved back again so that no transfer of fresh weft can then be effected. Hence, in this case also, the transfer of fresh weft is controlled by the main fork; and, by reason of its coupler H, being brought into action by the companion fork.

When the coupler is in its forward idle position, a coupler controller K, (consisting of a pivoted lever shown in Figs. 3 and 8) is held pressing lightly against an abutment L, on the coupler by a coiled spring M, whose opposite ends are attached respectively to said controller and to the change-shaft arm G, respectively. When now, the change-shaft is rocked as the result of detection by the companion fork, the spring M, is put under greater tension, and the controller is swung so as to push the coupler at once back to its innermost and active position. Hence, when the main fork detects (following pick No. 2, Fig. 2), the change-shaft is again rocked and this time in proper time to insert fresh weft when the empty shuttle is in the right-hand box following pick No. 3, Fig. 2. Hence, the fresh weft is laid in the correct shed when the companion fork B, first detects.

Correct operation demands that the companion fork B, should be rendered inactive following the blank picks of the empty shuttle at pick No. 3, in Fig. 2, and at picks Nos. 2, 4, and 6, in Fig. 1. To this end the change-shaft F, is surrounded by a loose sleeve N, which at opposite ends has rigidly secured upward projecting arms O, and P.

The left hand arm O, has a lateral arm Q, in the path of a part of the left-slide C, (Figs. 3, and 5) so that whenever slide C, moves forward the sleeve N is rocked. This swings the upper end of the right hand arm P, (Fig. 10) forward. This arm P, has a lateral pin R, extending into a slot $t$, in the front end of a rod S, which at its rear end has a disarmer T, consisting of a laterally projecting pin which extends through a cam slot U, in the wall of the right slide J, beneath the weft-fork tail V, at one side. A spring W, connects the rod S, and the slide J. When, now, the left-slide C, moves forward rocking the sleeve N, the rod S, moves forward, thus causing the disarmer T, to ride up the cam slot U, and hence to lift the fork tail V, above the path of the weft hammer hook (Fig. 12); so that the slide J, can not be moved forward either following blank picks 2, 4, and 6, in Fig. 1, nor following blank pick 3, in Fig. 2. Hence, the companion fork is rendered inactive, in the sense that it is so controlled that it cannot occupy a coöperative position with the parts governed by it, and hence cannot affect the weft-supplying mechanism nor the action of the main fork. Also, the companion fork is thus rendered inactive each time the main fork acts, and hence several times in succession during the weft-replenishing period in case the first detection is by the main fork.

The change-shaft F, is connected as usual to the take-up to render it inactive whenever the change-shaft is rocked, as through arm X, (Fig. 8) fast on the change-shaft. This is not sufficient in the present instance to prevent a thin place; and, hence, to avoid a thin place, the action of the take-up is also stopped by a governor Y, depending from the sleeve N, (Fig. 4) and hence working whenever the slide C, moves forward, and independent of the rocking of the change-shaft F.

The sleeve N, with its arms O, and P, is normally maintained in the position shown in Figs. 5, and 10, by a suitable spring, such as the spring $a$, shown in Fig. 5. The change-shaft F, is normally maintained in the position shown in Figs. 3, 8, and 9, by a spring not shown, but similar to that used in the Draper loom, and as shown, for example, at $d^3$, in United States Letters Patent of Jonas Northrop, No. 718,575, January 13, 1903.

The principles of this invention are applicable to any odd number of harnesses or shed-formations. It is only necessary that the coupler should receive an appropriate number of backward steps when the main fork first detects; and that it should be given an appropriate compensating or differential initial backward movement when the companion fork first detects.

Pick matching is secured by this invention with but few and simple changes and additions to the well-known Draper double-fork automatic weft-replenishing loom.

We claim—

1. An automatic weft-replenishing pick matching loom having, in combination, three harness and picking mechanisms which continue their normal operation during weft-absence detection and weft-replenishment; a weft-supplying mechanism at one side only of the loom; a change shaft governing the action of the weft-supplying mechanism; two weft-absence detectors, one at each side of the loom; a normally idle coupler between the main detector and change-shaft; mechanism between said main detector and coupler whereby at each of two successive detections of weft-absence by the main detector the coupler is moved one step and at the second step the coupler connects the main detector and the change shaft so that at the third successive detection of weft-absence by said main detector the change-shaft is actuated; connections between the companion detector at the supply side of the loom and the coupler whereby when the companion detector detects weft absence the coupler is moved at once into coupling position; and means governed by the main detector to render the companion detector inactive at each detection of weft-absence by the main detector.

2. An automatic weft-replenishing pick matching loom having, in combination, three harness and picking mechanisms which continue their normal operation during weft-absence detection and weft-replenishment; a weft-supplying mechanism; two weft-absence detectors, one at each side of the loom; a normally idle coupler between the main detector and the weft-supplying mechanism; mechanism between said main detector and coupler whereby at each of two successive detections of weft-absence by the main detector the coupler is moved one step and at the second step the coupler connects the main detector and the weft-supplying mechanism so that at the third successive detection of weft-absence by said main detector the weft-supplying mechanism is put into action; connections between the companion detector and the coupler whereby when the companion detector detects weft absence the coupler is moved at once into coupling position; and means governed by the main detector to render the companion detector inactive at each detection of weft-absence by the main detector.

3. An automatic weft-replenishing pick matching loom having, in combination, three harness and picking mechanisms; a weft-supplying mechanism at one side only of the loom; two weft-absence detectors, one at each side of the loom; a normally idle coupler between the main detector and the weft-supplying mechanism; mechanism between said detector and coupler whereby at each of two successive detections of weft-absence by the main detector the coupler is moved one step and at the second step the coupler connects the main detector and the weft-supplying mechanism so that at the third successive detection of weft-absence by said main detector the weft-supplying mechanism is put into action; and connections between the companion detector at the supply side of the loom and the coupler whereby when the companion detector detects weft absence the coupler is moved at once into coupling position.

4. An automatic weft-replenishing pick matching loom having, in combination, three harness and picking mechanisms; a weft-supplying mechanism; two weft-absence detectors, one at each side of the loom; a normally idle coupler between the main detector and the weft-supplying mechanism; mechanism between said detector and coupler whereby at each of two successive detections of weft-absence by the main detector the coupler is moved one step and at the second step the coupler connects the main detector and the weft-supplying mechanism so that at the third successive detection of weft-absence by said main detector the weft-supplying mechanism is put into action; connections between the companion detector and the coupler whereby when the companion detector detects weft absence the coupler is moved at once into coupling position; and means governed by the main detector to render the companion detector inactive at each detection of weft-absence by the main detector.

5. An automatic weft-replenishing pick matching loom having, in combination, three harness and picking mechanism; a weft-supplying mechanism; two weft-absence detectors, one at each side of the loom; a normally idle coupler between the main detector and the weft-supplying mechanism; mechanism between said detector and coupler whereby at each of two successive detections of weft-absence by the main detector the coupler is moved one step and at the second step the coupler connects the main detector and the weft-supplying mechanism so that at the third successive detection of weft-absence by said main detector the weft-supplying mechanism is put into action; and connections between the companion detector and the coupler whereby when the companion detector detects weft absence the coupler is moved at once into coupling position.

6. An automatic weft-replenishing pick matching loom having, in combination, three harness and picking mechanisms; a weft-supplying mechanism at one side only of the loom; two weft-absence detectors, one at each side of the loom, which control the action of the weft-supplying mechanism; and means governed by the main detector to render the companion detector inactive at each of the several detections of the weft-absence by the main detector during the weft-replenishing period.

7. An automatic weft-replenishing pick-matching loom having, in combination, picking and shedding mechanisms which maintain their normal action throughout weft-absence detection and weft-replenishment; a weft-supplying mechanism at one side only of the loom; two weft-absence detectors, one at each side of the loom; a change shaft which governs the action of the weft-supplying mechanism; a normally idle coupler between the main detector and said change-shaft; mechanism between said detector and the coupler whereby at each detection of weft-absence by said main detector the coupler is moved one step toward operative position, a plurality of such steps bringing said coupler into operative relation between the main detector and the change shaft; mechanism between the companion detector and the coupler which moves said coupler a plurality of steps when the companion detector detects weft-absence; intermediate connections between the two detectors to render the companion detector inactive each time the main detector detects weft-absence; and means for rendering the take-up idle whenever either detector detects weft-absence.

8. An automatic weft-replenishing pick-matching loom having, in combination, picking and shedding mechanisms; a weft-supplying mechanism; two weft-absence detectors, one at each side of the loom; a normally idle coupler between the main detector and the weft-supplying mechanism; mechanism between said main detector and the coupler whereby at each detection of weft-absence by said main detector the coupler is moved one step toward operative position, a plurality of such steps bringing said coupler into operative relation between the main detector and the weft-supplying mechanism; mechanism between the companion detector and the coupler which moves said coupler a plurality of steps when the companion detector detects weft-absence; and intermediate connections between the two detectors to render the companion detector inactive each time the main detector detects weft-absence.

9. An automatic weft-replenishing pick-matching loom having, in combination, picking and shedding mechanisms; a weft-supplying mechanism; two weft-absence detectors, one at each side of the loom; a normally idle coupler between the main detector and the weft-supplying mechanism; mechanism between said main detector and the coupler whereby at each detection of weft-absence by said main detector the coupler is moved one step toward operative position, a plurality of such steps bringing said coupler into operative relation between the main detector and the weft-supplying mechanism; and mechanism between the companion detector and the coupler which moves said coupler a plurality of steps when the companion detector detects weft-absence.

10. An automatic weft-replenishing pick-matching loom having, in combination, picking and shedding mechanisms; a weft-supplying mechanism; two weft-absence detectors, one at each side of the loom; mechanism between the main detector and the weft-supplying mechanism whereby after a plurality of successive detections by the main detector the weft-supplying mechanism is put into action; and mechanism between the companion detector and the main detector which accelerates the operative action of the main detector.

11. An automatic weft-replenishing pick-matching loom having, in combination, three harness and picking mechanisms; a weft-supplying mechanism; two weft-absence detectors, one at each side of the loom; a normally idle coupler between the main detector and the weft-supplying mechanism; mechanism between said detector and coupler whereby at each of two successive detections of weft-absence by the main detector the coupler is moved one step and at the second step the coupler connects the main detector and the weft-supplying mechanism so that at the third successive detection of weft-absence by said main detector the weft-supplying mechanism is put into action; connections between the companion detector at the supply side of the loom and the coupler whereby when the companion detector detects weft-absence the coupler is moved at once into coupling position; and means for rendering the take-up idle whenever either fork detects weft-absence.

In witness whereof we affix our signatures in presence of two witnesses.

GEORGE H. LEITNER.
WILLIAM E. JOHNSON.

Witnesses:
ARTHUR S. BROWNE,
GEO. H. GERCKE.